Figure 1:
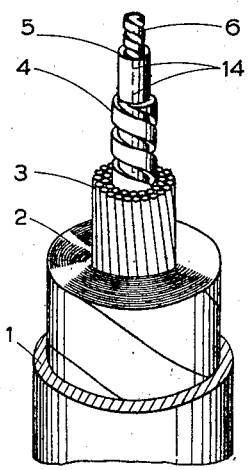

July 16, 1957     L. EMANUELI     2,799,720

GAS-PRESSURE ELECTRIC CABLES

Filed April 9, 1952

LUIGI EMANUELI
INVENTOR by Eugene E. Stevens
ATTORNEY

United States Patent Office 2,799,720
Patented July 16, 1957

2,799,720

GAS-PRESSURE ELECTRIC CABLES

Luigi Emanueli, Milan, Italy, assignor to Pirelli Società per Azioni, Milan, Italy, a corporation of Italy Application April 9, 1952, Serial No. 281,286

5 Claims. (Cl. 174—25)

The present invention relates to gas-pressure electric cables, that is to say to cables wherein, by reason of the presence of a gas under pressure, a degree of pressure is exerted on the dielectric or filling material.

In such cables essential importance must be attached to the problem of pressure transmission all along the cable. This problem has been at least partly and satisfactorily solved in the case of the so-called compression cables, wherein the gas is not in direct contact with the dielectric of the cable, but is separated therefrom by means of a membrane impermeable to the gas. In such a cable there is a continuous interspace, containing gas only, whereby the gas is allowed to flow freely from one end to the other of each cable section, thus ensuring that the required pressure is uniformly exerted on the dielectric along the whole length of the cable.

A disadvantage with such a type of cable arises from the fact that, while a very good transmission of pressure in the longitudinal direction is ensured, an equally good pressure transmission in the radial direction will be exerted only if the cable insulation is well impregnated everywhere with oil or liquid insulating compound, which is not always the case, especially when the cable is laid on a slope and is operating at a high temperature.

As to the so-called impregnated pressure cable, wherein the gas is in direct contact with the insulating material, a satisfactory solution of the pressure transmission problem has never been attained. In fact, as is already well known, the rate of the gaseous diffusion through the liquid impregnating compound, as utilized for cables, is extremely low, whereby, in practice, the pressure is transmitted only by mechanical displacement of the liquid insulating mass and not by diffusion through it. Nevertheless, such mechanical displacement will occur only in a slow and laborious manner when the cable is cold (particularly if highly viscous compounds have been used in order to prevent them from draining out) whereby pressure transmission is hindered or at least is considerably retarded.

To obviate the above disadvantages, recourse has already been had on the part of some cable manufacturers to the so-called gas-filled cables, wherein all insulating compound in excess of the amount strictly required to impregnate the individual paper layers is removed by submitting the dielectric in advance to a thorough draining. However, as already well known, such a procedure is prejudicial to the dielectric strength of the cable.

A further expedient, to which recourse has been had by some other cable manufacturers, consists in leaving a channel free from insulating compound throughout the cable, and putting it into communication with the dielectric through a number of openings, intended to allow a free passage of gas. However, such openings, besides allowing the gas to pass freely in order to keep the cable impregnating compound under pressure, also allow a flow of impregnating compound in the opposite direction, whereby ultimately the channel becomes obstructed, and thus it is no longer able to carry out its function.

All the above shortcomings are obviated, according to the present invention, which consists in a gas-pressure single- or multi-core electric cable, provided with one or more internal gas-distributing tubes having in the tube wall perforations which act as valves, allowing a free flow of gas from the inside toward the outside of the tube, but preventing flow of insulating compound or gas from the outside toward the inside.

For putting the invention into effect, the gas-distributing tube or tubes may be formed of elastic material, such, for instance, as natural or synthetic rubber, the latter being particularly suitable as highly resistant to insulating compounds or oils at a high temperature. In the wall of the tube or of each tube, as the case may be, small apertures are formed without the removal of material, this being done, for example, by means of a needle or thin blade. Such apertures will serve to permit passage of gas from inside the tube, but will close on any tendency for passage of fluid from the outside.

In order that the invention may be clearly understood and readily carried into effect, it will now be described more fully with reference to the accompanying drawing which, by way of example illustrates in perspective view four forms of cable in accordance therewith, certain portions being in each case shown as removed in order that all members of the cable may be clearly perceived.

In the drawing wherein like reference characters have been used to designate the same, or analogous members throughout the several views—

Figure 2:
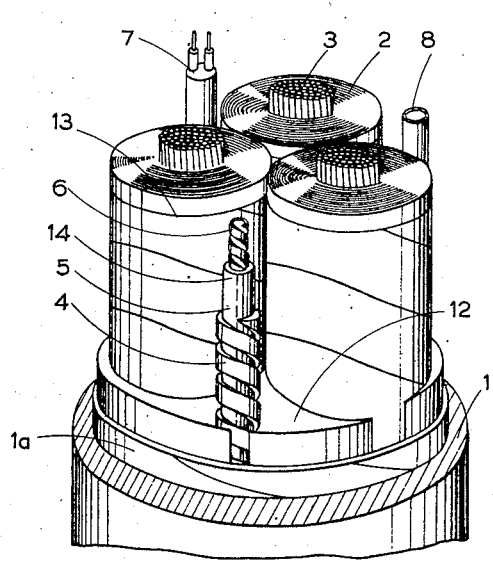

Fig. 1 is a perspective view of an electric cable end illustrating one form of my invention, certain parts being broken away and shown in section; and Fig. 2 is a broken and sectional perspective view showing a further modification of the invention wherein the cable has multiple cores and gas tube outlet means as disclosed in Fig. 1.

Referring to the drawing, Figure 1 illustrates a single-core cable having an outside sheath 1 surrounding insulation 2 made, for example, of paper impregnated with viscous oil or insulating compound. The stranded conductor 3 is hollow and embraces a metal helix 4 whereby an axial channel is defined. Within the helix 4 is a tube 5 of elastic material for the distribution of gas; this tube may, if desired, be provided internally with a reinforcing metal helix 6. In the wall of the tube 5 there are formed small apertures 14, conveniently produced by puncturing the tube with a needle or thin blade. Preferably the apertures are equally spaced and they are so disposed that their opening by virtue of internal gas pressure is not obstructed by the turns of the helix 4. Pressure from the outside, however, merely serves to hold the apertures tightly closed. The helix 4 prevents flattening or elongation of the tube 5 during the application of the stranded conductor 3.

Figure 2 illustrates a three-core gas-pressure cable wherein each of the stranded conductors 3 is surrounded by insulation 2 and is provided with a metallized shielding 13. The spaces between the cable cores and enclosed by the external sheath 1 having a lining 1a of insulating material are occupied by filling material 12, suitably constituted by paper impregnated with viscous oil or insulating compound. As indicated, in one of these spaces and surrounded by the filling material 12, there is located a gas-distributing tube 5, which may be similar in construction to that depicted in Figure 1, namely, that it may be located within a protective metal helix 4 and may be provided internally with a reinforcing metal helix 6. The apertures 14 in this case also made without the removal of material and consequently function in a manner similar to those described with reference to Figure 1. One or more further gas-distributing tubes may be similarly disposed within the sheath 1. Also the cable structure may include a signaling cable 7 and/or a tube 8, suitably of metal, designed to convey gas through a length of cable without permitting its distribution within that length; to this end the tube 8 is unprovided with perforations.

It is to be noted that the convolutions of the metal helix 4 as used in all of the disclosed forms of the invention has a dual function in that they not only sustain the elastic material tube 5 but also facilitate the opening of the valve-like apertures 14 for the outward passage of gas from the tube 5. As to the last-mentioned function of helix 4, it will be noted that in the Fig. 1 and 2 forms of the invention the opening of slits 14 under gas pressure from within elastic tube 5 is facilitated by reason of the fact that the helix convolutions space the slitted tube wall portions from the surrounding conductor (3) surface (Fig. 1) and from the surrounding insulation 12 (Fig. 2). The function of helix 4 in effecting positive spacement of the valve-like apertures 14 from surrounding surfaces is therefore important, although of course not absolutely necessary.

What I claim and desire to secure by Letters Patent of the United States is:

1. A gas-pressure electric cable comprising in combination, a conductor comprising at least one conducting strand, insulating material surrounding the said conductor impregnated with a fluid or semi-fluid insulating compound, an enclosing sheath, and at least one gas-distributing tube within said sheath made of elastic material and having distributed at short intervals along its length small punctures formed in the wall of the tube without the removal of any of the material of the tube to act as normally closed valves to permit passage of gas from the tube outwardly but to prevent passage of insulating compound into the tube.

2. A gas-pressure electric cable, as in claim 1, provided with a reinforcing helically wound metal strip within said tube.

3. A gas-pressure electric cable as in claim 1, provided with a protective flexible open metal helix enclosing the said tube.

4. A gas-pressure electric cable comprising in combination a hollow stranded conductor, solid insulating material surrounding the said conductor and impregnated with an insulating compound, an enclosing sheath and, located within the said conductor, a gas-distributing tube of elastic material having distributed at short intervals along its length small punctures formed in the wall of the tube without the removal of any of the material of the tube to act as normally closed valves to permit passage of gas from the tube outwardly but to prevent passage of insulating compound into the tube.

5. A gas-pressure electric cable comprising in combination at least two stranded conductors, insulating material around each of the said conductors impregnated with a fluid or semi-fluid insulating compound, a sheath enclosing the said conductors, filling material located between said insulating material and said sheath, and, located within said filling material, at least one gas-distributing tube within said sheath made of elastic material and having distributed at short intervals along its length small punctures formed in the wall of the tube without the removal of any of the material of the tube to act as normally closed valves constructed to permit passage of gas from the tube outwardly but to prevent passage of insulating compound into the tube.

References Cited in the file of this patent

UNITED STATES PATENTS

| | | |
|---|---|---|
| 1,939,264 | Hill | Dec. 12, 1933 |
| 1,977,325 | Pfannkuch | Oct. 16, 1934 |
| 2,147,402 | Faucett | Feb. 14, 1939 |
| 2,237,402 | Beaver et al. | Apr. 8, 1941 |
| 2,253,985 | Shanklin | Aug. 26, 1941 |
| 2,261,742 | Matsumoto | Nov. 4, 1941 |
| 2,326,557 | Pierce | Aug. 10, 1943 |
| 2,425,851 | Wyatt | Aug. 19, 1947 |
| 2,457,436 | Bennett | Dec. 28, 1948 |